US009663027B2

United States Patent
Hellin Navarro et al.

(10) Patent No.: US 9,663,027 B2
(45) Date of Patent: May 30, 2017

(54) EXTERIOR REAR VIEW MIRROR ASSEMBLY FOR A MOTOR VEHICLE

(71) Applicant: FICO MIRRORS, S.A., Barcelona (ES)

(72) Inventors: Sergio Hellin Navarro, Barcelona (ES); Nestor Ruiz Ortega, Barcelona (ES); Maria Luisa Novella, Barcelona (ES); Carles Montero Foix, Barcelona (ES); Josep Pujadas Beltran, Barcelona (ES); Robert Lopez Galera, Barcelona (ES)

(73) Assignee: FICO MIRRORS, S.A., Barcelona (ES)

( * ) Notice: Subject to any disclaimer, the term of this patent is extended or adjusted under 35 U.S.C. 154(b) by 51 days.

(21) Appl. No.: 14/184,311

(22) Filed: Feb. 19, 2014

(65) Prior Publication Data

US 2015/0232020 A1   Aug. 20, 2015

(51) Int. Cl.
  *F21S 8/10*    (2006.01)
  *B60R 1/12*    (2006.01)
  *B60Q 1/26*    (2006.01)
  *B60Q 1/00*    (2006.01)

(52) U.S. Cl.
  CPC ......... *B60Q 1/2665* (2013.01); *B60Q 1/0088* (2013.01); *B60R 1/1207* (2013.01); *F21S 48/215* (2013.01); *F21S 48/23* (2013.01); *F21S 48/33* (2013.01)

(58) Field of Classification Search
  CPC ................... F21S 48/33; B60R 2001/1215
  See application file for complete search history.

(56) References Cited

U.S. PATENT DOCUMENTS

| | | |
|---|---|---|
| 5,207,492 A | 5/1993 | Roberts |
| 6,045,243 A | 4/2000 | Muth et al. |
| 6,076,948 A | 6/2000 | Bukosky et al. |
| 6,099,154 A | 8/2000 | Olney |
| 6,264,353 B1 | 7/2001 | Caraher et al. |
| 6,556,350 B2 | 4/2003 | Nakaho et al. |
| 6,926,431 B1 | 8/2005 | Foote et al. |
| 7,008,091 B2 | 3/2006 | Mathieu et al. |
| 7,241,037 B2 | 7/2007 | Mathieu et al. |
| 7,273,307 B2 | 9/2007 | Mathieu |

(Continued)

FOREIGN PATENT DOCUMENTS

| | | |
|---|---|---|
| EP | 0719675 | 7/1996 |
| FR | 2941188 | 7/2010 |

*Primary Examiner* — Elmito Breval
*Assistant Examiner* — Zachary J Snyder
(74) *Attorney, Agent, or Firm* — Greer, Burns & Crain, Ltd.

(57) ABSTRACT

An exterior rear view mirror assembly for a motor vehicle has a reflecting element, a clamping plate, a first adhesive element fixing the reflective element to the clamping plate, and a watertight illumination module. The watertight illumination module has a printed circuit board arranged within the watertight illumination module at an angle of 1 to 90 degrees relative to the clamping plate, at least one light emitting diode arranged on the printed circuit board, an inner reflective surface having a reflectivity coefficient of at least 30% and at least partially exposed to the light emitted by the at least one light emitting diode, and an outer portion with at least one hole with a sealing element engaged therein.

23 Claims, 4 Drawing Sheets

(56) References Cited

U.S. PATENT DOCUMENTS

| | | |
|---|---|---|
| 7,327,321 B2 | 2/2008 | Todd et al. |
| 7,360,931 B2 | 4/2008 | Haag |
| 7,416,318 B2 | 8/2008 | Mathieu |
| 7,427,150 B2 | 9/2008 | Carter et al. |
| 7,717,596 B1 | 5/2010 | Bell |
| 2004/0070857 A1* | 4/2004 | Bonardi ............... B60Q 1/2665 359/871 |
| 2004/0213009 A1* | 10/2004 | Yagi ..................... B60Q 1/2665 362/494 |
| 2008/0212189 A1* | 9/2008 | Baur et al. .................... 359/604 |
| 2009/0115631 A1* | 5/2009 | Foote et al. .................. 340/901 |

* cited by examiner

EXTERIOR REAR VIEW MIRROR ASSEMBLY FOR A MOTOR VEHICLE

BACKGROUND OF THE INVENTION

The present invention generally relates to the field of exterior rear view mirrors for motor vehicles, specifically to rear view mirrors with illumination module systems.

It is well known in the art providing a lighting device in a mirror. The beneficial effects of incorporating such lighting device have been revealed in many patents including FR2941188; U.S. Pat. No. 7,717,596; U.S. Pat. No. 7,008,091; U.S. Pat. No. 6,926,431; U.S. Pat. No. 7,360,931; U.S. Pat. No. 7,427,150; U.S. Pat. No. 6,264,353; U.S. Pat. No. 7,241,037; U.S. Pat. No. 7,416,318; U.S. Pat. No. 7,273,307; U.S. Pat. No. 7,327,321.

In general, in all of them a rear view mirror assembly comprising a mirror with an aperture, a light source and a subassembly fixed to the mirror is disclosed.

It is also well known in the art providing a light diffusing film for reflecting or transmitting certain portions of the wavelength of the light spectrum including U.S. Pat. No. 6,045,243; U.S. Pat. No. 5,207,492; U.S. Pat. No. 5,825,527; U.S. Pat. No. 6,556,350; U.S. Pat. No. 6,099,154; EP0719675.

There remains, however, a need for an exterior rear view mirror assembly for a motor vehicle with which illumination partially on users different from the driver can be avoided in an efficient manner and at a reduced cost.

SUMMARY OF THE INVENTION

The present invention relates to an exterior rear view mirror assembly for a motor vehicle with a watertight illumination module that can be fitted in all kinds of vehicles such as, but not limited to, cars, trucks and motorcycles. The watertight illumination module is a single removable module that allows an easy assembly. The watertight illumination module comprises a reflective element.

An exterior rear view mirror assembly for a motor vehicle is provided with which illumination partially on users other than the driver can be avoided, while maximizing the output light, directing the light source towards the driver and reducing the possibility of dazzling other users. The invention solves the problem advantageously.

This lighting system alerts drivers of the presence of an object in the mirror blind spot. The minor of the invention includes sealing means designed to prevent any liquid from penetrating the watertight illumination module.

Regarding the light diffusing film, the mirror of the invention may include a neutral density light diffusing film homogenizing the illumination pattern, while preventing vision from the outside. The watertight illumination module has been designed as a single element. This concept allows an easy assembly of different types of mirror panes (from curved pane to flat pane).

The present invention relates to an exterior rear view minor assembly with a watertight illumination module, the assembly comprising a reflective element attached to a clamping plate by means of a first adhesive element fixing said reflective element with said clamping plate. Such reflective element may have a metalized first or second surface. In reflective elements having a metalized first surface, plating is on the surface exposed to light, said light impinging thereon and being reflected therefrom so that the substrate does not need to be transparent. In reflective elements having a metalized second surface, light must be passed through the mirror pane, or plastic pane, be reflected and be passed again through the mirror pane, or plastic pane. The reflective element includes a multidimensional image provided on the second or first surface.

The rear view mirror assembly further includes a watertight illumination module located on the rear outer part and at one end of the clamping plate. A printed circuit board is arranged within the watertight illumination module at an angle from 1 to 90 degrees relative to the clamping plate, that is, the printed circuit board is not parallel to the clamping plate. At least one light emitting diode is provided on said printed circuit board. At least one hole is formed in the outer part of said watertight illumination module for receiving a corresponding sealing element, such as a plastic sealing grommet.

The watertight illumination module has an inner reflective surface at least partially exposed to the light emitted by the at least one light emitting diode which impinges thereon and reflects therefrom. Thus, light is emitted indirectly from the watertight illumination module towards the multidimensional image. The reflectivity coefficient of the inner reflective surface is at least 30%.

The watertight illumination module's inner reflective surface may be metalized.

Furthermore, the inner reflective surface may be provided with a random and/or textured structure. The random structure is defined as that which allows a random distribution of incident illumination without losing the preferential direction defined by the surface whereas the textured structure allows for a non-periodic distribution of the incident illumination without losing the preferential direction defined by the surface.

The watertight illumination module is detachably attached to the first adhesive element, thereby linking the watertight illumination module to the first adhesive element. The detachable attachment may be a second adhesive element.

The first adhesive element may be of the heating type.

The mirror assembly may further include a light diffusing film arranged between the reflective element and the watertight illumination module. Thus, in this case, light is emitted indirectly from the watertight illumination module towards the multidimensional image passing through the light diffusing film.

The mirror assembly may further include a reflecting layer opaque to ambient light and transmissive to the light emitted by the watertight illumination module and having a thickness comprised between 1 nm and 1 µm. The reflecting layer is located between the multidimensional image and the watertight illumination module, concealing the multidimensional image when the watertight illumination module is not lit.

The reflecting layer may have a thickness comprised between 20 nm and 300 nm. The reflecting layer may be monolayer or multilayer. The reflecting layer may be metallic, non-metallic or a combination of both. The reflecting layer may be provided by well-known deposition techniques, such as sputtering or physical vapor deposition.

The reflecting layer may be provided on the light diffusing film or at least partially on the second surface of the reflective element, the latter only if the multidimensional image is provided on the first surface of the reflective element.

The watertight illumination module emits light through the reflective element by at least one light emitting diode, whose light emission is performed indirectly as explained above.

The watertight illumination module may have at least one cable connecting the printed circuit board with a connector, with such cable being attached to the clamping plate by means of at least one clip.

The watertight illumination module may have an integrated connector.

The watertight illumination module may be arranged asymmetrically in order that the light emitting diodes are positioned in the outermost portion of the vehicle; hence further reducing the illumination on users different from the driver. In other words, the printed circuit board is arranged in an outermost part of the inner portion and the inner reflective surface is comprised in an innermost part of the inner portion.

At the same time, in order to maximize the amount of light at the output and to prevent light emitting diodes from being seen by the driver, the printed circuit board and the light source are required to be arranged at an angle from 1 to 90 degrees.

Further objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of a non-limiting example, with reference to the accompanying drawings, in which.

DETAILED DESCRIPTION OF THE PREFERRED EMBODIMENTS

Figure 1:
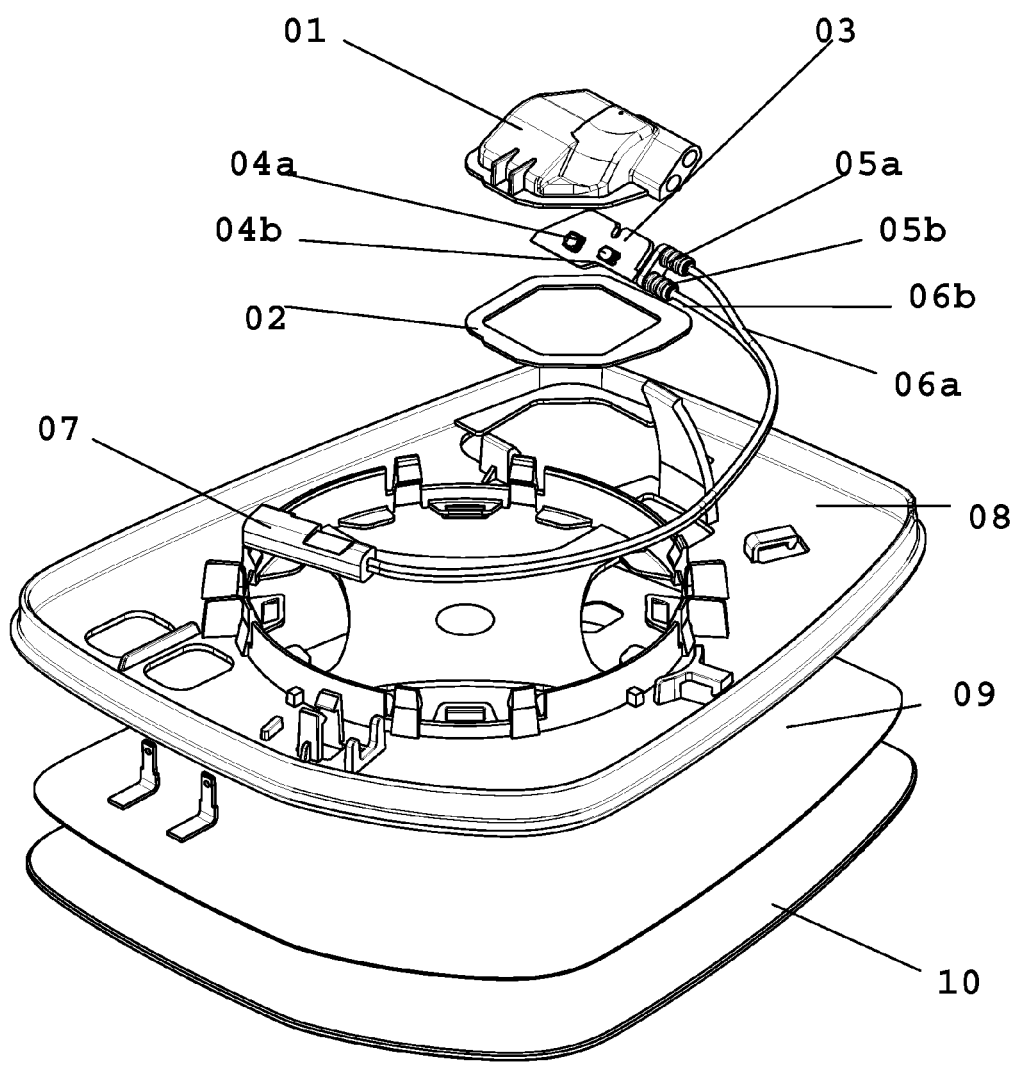
FIG. 1 shows an exploded view of a first embodiment in which all the parts of the assembly of the present invention are shown in detail.

FIG. 1 shows the exterior rear view mirror assembly suitable for carrying a watertight illumination module. The assembly comprises a reflective element (10), a heating adhesive (09) for fixing said reflective element to the clamping plate (08), a watertight illumination module (01), a second adhesive (02) fixing the watertight illumination module (01) to the heating adhesive (09). The watertight illumination module (01) has an inner cavity where a printed circuit board (03) and two light emitting diodes (04a, 04b) powered by this printed circuit board (03) are located. The printed circuit board (03) has two power cables (06a, 06b) passing through the watertight illumination module (01). Two plastic grommets (05a, 05b) are provided to cover the holes formed by these two cables (06a, 06b) when passing through the coating of the watertight illumination module (01) and to ensure the sealing of the watertight illumination module (01). The power cables (06a, 06b) extend along the surface of the clamping plate (08) whose end has a connector (07) which will be connected to a power source.

Figure 2:
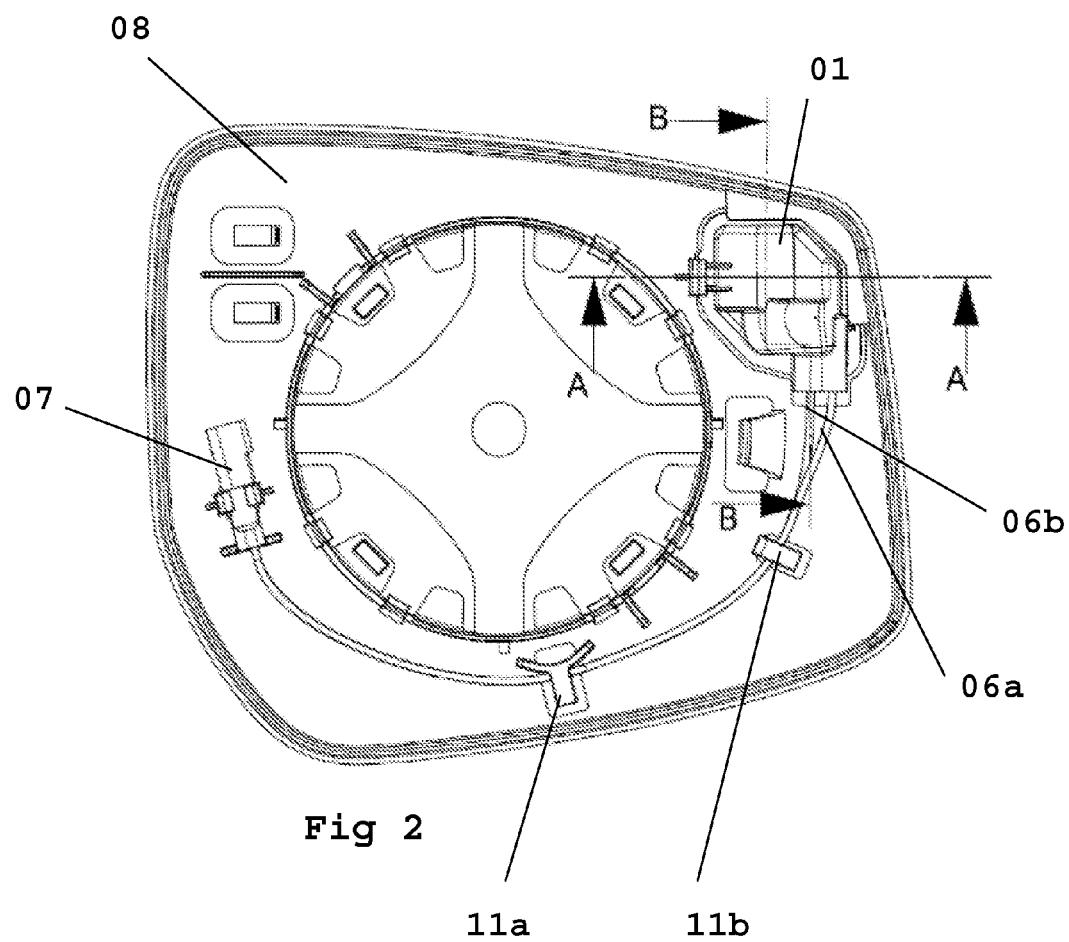
FIG. 2 shows a plan view of the assembly according to the invention.

FIG. 2 shows a plan view of the exterior rear view mirror assembly suitable for carrying a watertight illumination module (01). Two power cables (06a, 06b) extending along the surface of the clamping plate (08) are provided whose end has a connector (07) connected to a power source. The power cables (06a, 06b) are secured to the clamping plate by means of clips (11a, 11b).

Figure 3:
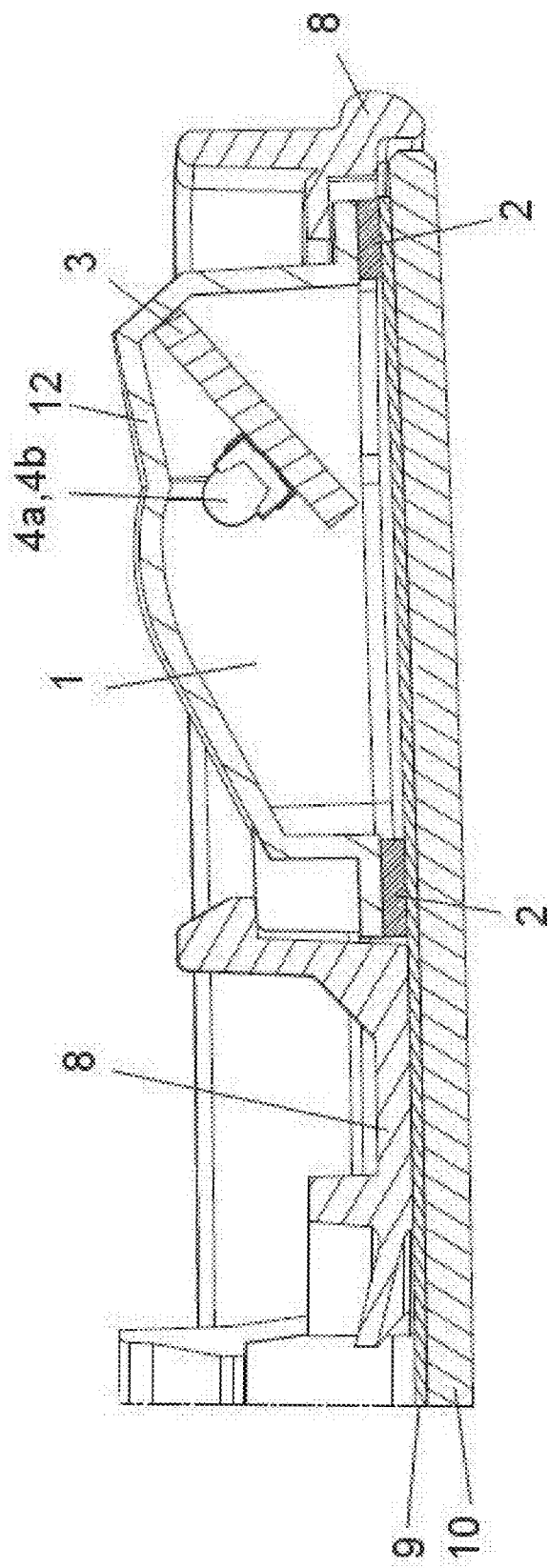
FIG. 3 shows is sectional view of the assembly of the invention taken along line A-A.

The detail of the configuration of the watertight illumination module (01) is shown in FIG. 3. The protective case (12) of said watertight illumination module, with a metalized and textured surface in its interior, is attached to the first adhesive (09) by means of the second adhesive (02). The printed circuit board (03) rests on one portion of the protective case (12) at an angle of 35 degrees. Two light emitting diodes (04a, 04b) rest on and are electrically operated in the surface of the printed circuit board (03). The light emitted by these two light emitting diodes (04a, 04b) bounces on the metalized surface of the protective case of the illumination module emitting light indirectly and thus passing through the surface of the reflecting element (10) through its opening.

Figure 4:
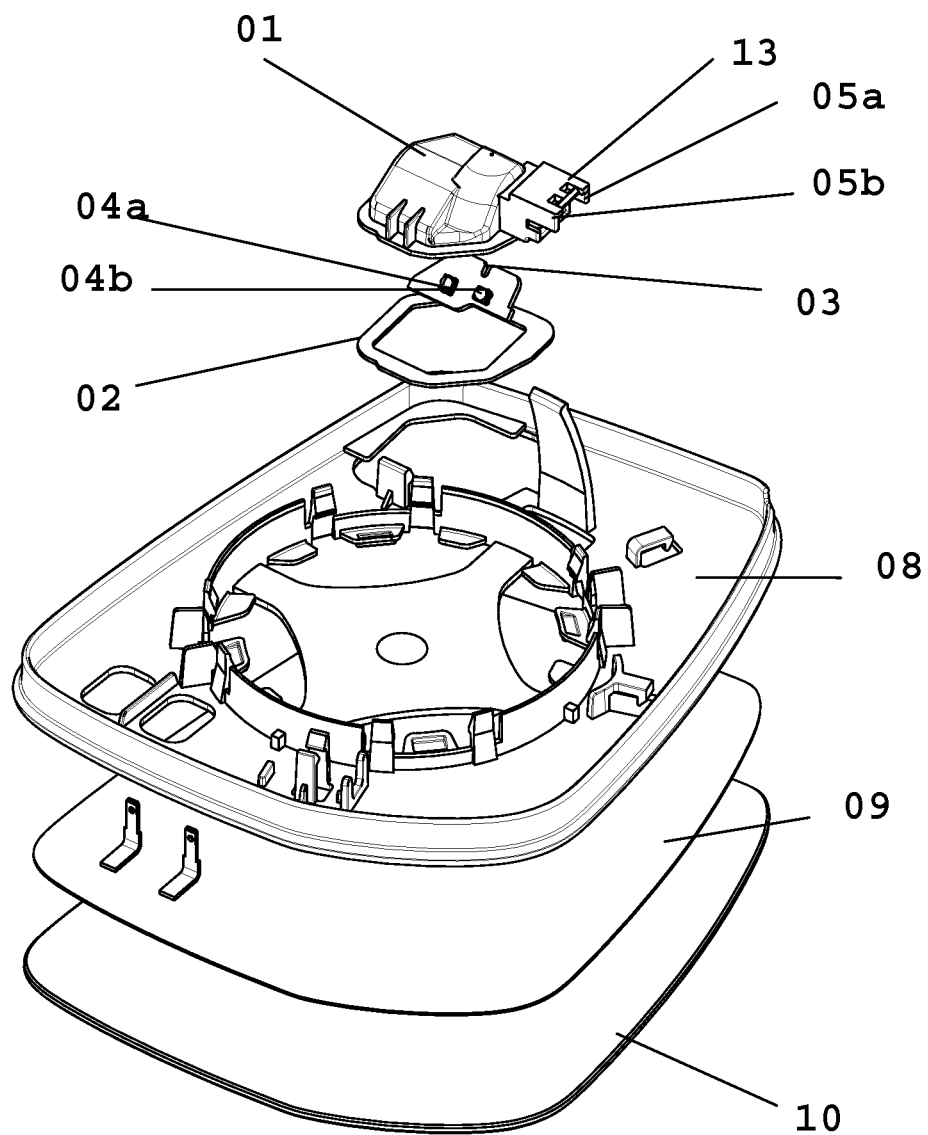
FIG. 4 shows is exploded view of the assembly of the invention with an integrated connector.

FIG. 4 shows the exterior rear view mirror assembly suitable for carrying a watertight illumination module. This comprises a reflective element (10), a heating adhesive (09) for fixing the reflecting member to the clamping plate (08), a watertight illumination module (01), a second adhesive (02) fixing the watertight illumination module (01) to the heating adhesive (09), the watertight illumination module (01) having an inner cavity where a printed circuit board (03) and two light emitting diodes (04a, 04b) powered by the printed circuit board (03) are located, the printed circuit board (03) being coupled with an integrated connector (13) in the watertight illumination module (01) itself, the watertight illumination module (01) being sealed through the use of two plastic grommets (05a, 05b).

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Reference signs related to drawings and placed in parentheses in a claim are solely for attempting to increase the intelligibility of the claim, and shall not be construed as limiting the scope of the claim. Thus, the scope of the present invention should not be limited by particular embodiments, but should be determined only by a fair reading of the claims that follow.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An exterior rear view mirror assembly for a motor vehicle comprising:
    a reflecting element with a multidimensional image;
    a clamping plate;
    a first adhesive element fixing the reflective element to the clamping plate; and
    a watertight illumination module;
    wherein the watertight illumination module is detachably attached to the first adhesive element and wherein the watertight illumination module further comprises:
    an inner portion with an inner reflective surface with a reflectivity coefficient of at least 30%, the inner reflective surface at least partially exposed to the light emitted by the at least one light emitting diode, a printed circuit board arranged within the inner portion at an angle of 1 to 90 degrees relative to the clamping plate, wherein a first side of the printed circuit board rests on the watertight illumination module and a second side opposite the first side does not rest on the watertight illumination module, at least one light emitting diode arranged on the printed circuit board, and an outer portion with at least one hole with a sealing element engaged therein.

2. The exterior rear view mirror assembly as claimed in claim 1, wherein the printed circuit board is arranged in an outermost part of the inner portion and the inner reflective surface is comprised in an innermost part of the inner portion.

3. The exterior rear view mirror assembly as claimed in claim 1, wherein the reflecting element has a metalized first surface.

4. The exterior rear view mirror assembly as claimed in claim 1, wherein the reflecting element has a metalized second surface.

5. The exterior rear view mirror assembly as claimed in claim 1, wherein the watertight illumination module is detachably attached directly to the first adhesive element by a second adhesive element.

6. The exterior rear view mirror assembly as claimed in claim 1, wherein the first adhesive element is of the heating type.

7. The exterior rear view mirror assembly as claimed in claim 1, wherein the inner reflective surface of the watertight illumination module is provided with a random structure.

8. The exterior rear view mirror assembly as claimed in claim 1, wherein the inner reflective surface of the watertight illumination module is provided with a textured structure.

9. The exterior rear view mirror assembly as claimed in claim 1, wherein the inner reflective surface is a metalized surface.

10. The exterior rear view mirror assembly as claimed in claim 1, wherein the sealing element is a plastic grommet.

11. The exterior rear view mirror assembly as claimed in claim 1, wherein the multidimensional image is provided on the second surface of the reflective element.

12. The exterior rear view mirror assembly as claimed in claim 1, wherein the multidimensional image is provided on the first surface of the reflective element.

13. The exterior rear view mirror assembly as claimed in claim 1, further comprising a light diffusing film disposed between the reflective element and the watertight illumination module.

14. The exterior rear view mirror assembly as claimed in claim 1, further comprising a reflective layer opaque to ambient light but transmissive to the light emitted by the watertight illumination module, having a thickness comprised between 1 nm and 1 µm and located between the multidimensional image and the watertight illumination module.

15. The exterior rear view mirror assembly as claimed in claim 14, wherein the reflecting layer is monolayer.

16. The exterior rear view mirror assembly as claimed in claim 14, wherein the reflective layer is multilayer.

17. The exterior rear view mirror assembly as claimed in claim 14, wherein the multidimensional image is provided on the first surface of the reflective element, and the reflective layer is provided at least partially on the second surface of the reflective element.

18. The exterior rear view mirror assembly as claimed in claim 14, further comprising a light diffusing film disposed between the reflective element and the watertight illumination module, wherein the reflective layer is provided on the light diffusing film.

19. The exterior rear view mirror assembly as claimed in claim 1, wherein the watertight illumination module emits light indirectly through a reflective element by means of the at least one light emitting diode.

20. The exterior rear view mirror assembly as claimed in claim 1, wherein the watertight illumination module has at least one cable connecting the printed circuit board with a connector, the at least one cable traversing the sealing element.

21. The exterior rear view mirror assembly as claimed in claim 20, wherein the at least one cable is fixed to the clamping plate by at least one clip.

22. The exterior rear view mirror assembly as claimed in claim 1, wherein the watertight illumination module has an integrated connector.

23. An exterior rear view minor assembly for a motor vehicle comprising:

a reflecting element with a multidimensional image;

a clamping plate;

a first adhesive element fixing the reflective element to the clamping plate; and a watertight illumination module, wherein the watertight illumination module is detachably attached to the first adhesive element and wherein the watertight illumination module further comprises:

at least one light emitting diode arranged on a circuit board at an angle of 1 to 90 degrees relative to the clamping plate, wherein the circuit board has a first surface facing the reflecting element and a second surface opposite the first, and wherein the at least one light emitting diode is arranged on the second surface of the circuit board;

an inner portion with an inner reflective surface with a reflectivity coefficient of at least 30%, the inner reflective surface at least partially exposed to the light emitted by the at least one light emitting diode such that light emitted from the at least one LED impinges on the inner reflective surface and reflects away therefrom, and an outer portion with at least one hole with a sealing element engaged therein.

* * * * *